UNITED STATES PATENT OFFICE.

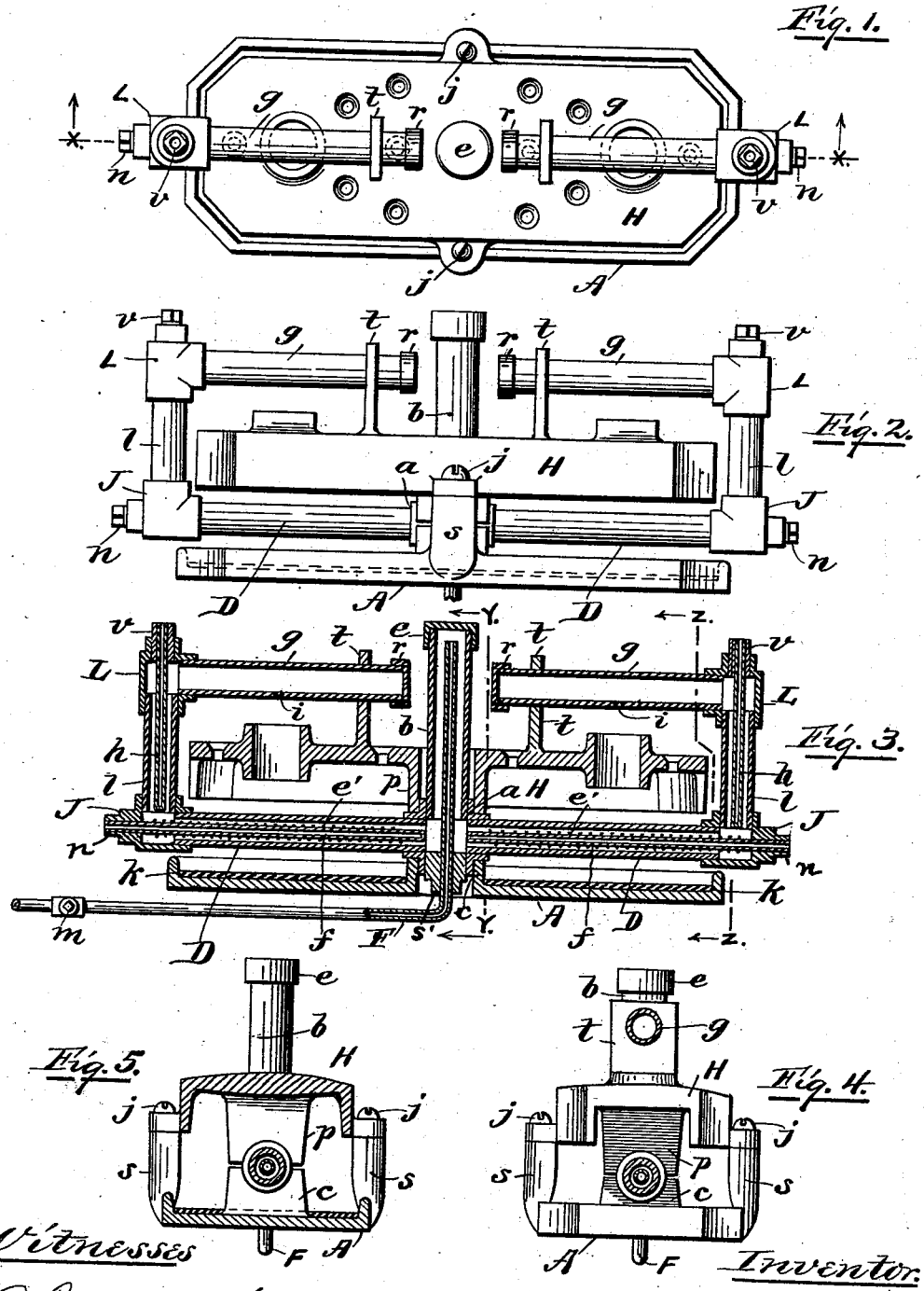

JOHN W. WEEKS, OF PROVIDENCE, RHODE ISLAND.

GAS HEATING APPARATUS.

SPECIFICATION forming part of Letters Patent No. 507,699, dated October 31, 1893.

Application filed May 20, 1893. Serial No. 474,886. (No model.)

*To all whom it may concern:*

Be it known that I, JOHN W. WEEKS, of Providence, in the county of Providence and State of Rhode Island, have invented certain new and useful Improvements in Gas Heating Apparatus; and I do hereby declare that the following is a full, clear, and exact description thereof, reference being had to the accompanying drawings, and to the letters of reference marked thereon, which form a part of this specification.

This invention relates to that class of coal-oil, naphtha or spirits consuming apparatus in which the fluid used for fuel, is first converted into a gas before it is consumed. Its object is to obtain more heat from a given quantity of fuel, and at the same time remove or lessen the risk of accidents arising from the inflammable nature of the fluid used. It is illustrated in the accompanying drawings.

Figure 1, shows a top view of the apparatus. Fig. 2, is a front elevation of the same. Fig. 3, is a vertical longitudinal section taken through the center in the direction of line $x, x$, in Fig. 1. Fig. 4, is a vertical cross section on line $z z$, in Fig. 3. Fig. 5, is a vertical cross section on line $y y$, in Fig. 3.

The apparatus consists of a light metal tray A, which has a boss $c$, in its center, with an opening through it made to receive a branch of the cross coupling $a$. A short piece of pipe $b$, is screwed vertically into the upper opening of the coupling $a$, the upper end of the pipe being closed air-tight, by means of a screw cap $e$. To make the details clearer, the description will be confined mainly to one-half of the apparatus, as the other half is the same in construction and operation.

A horizontal pipe D, has one end screwed into a side opening in the coupling $a$, and its outer end screwed into a side opening in a T-coupling J, that has a short, vertical pipe $l$, screwed into its upper opening. The vertical pipe $l$, has a T-coupling L, screwed into its upper end, and into the inner side opening of this coupling, a short, horizontal pipe $g$, has one end screwed and its other end closed up air-tight, by a screw cap $r$.

So far the description relates to the outside pipes seen in Fig. 2. The arrangement of the pipes inside of these outer pipes, is as follows:

Referring to Fig. 3,—the end of the pipe F, that connects the apparatus with a reservoir of fuel, not shown, passes up through the plug $s'$, in which it is tightly fitted, nearly to the top of the pipe $b$, and is left entirely open at its upper end. A small pipe $f$, closed tight at its inner end, is put in through a screw-plug $n$, into which it is tightly fitted, and the plug $n$, is screwed into the outer side opening in the T-coupling J, so as to bring the pipe $f$, inside the pipe D, with a small space between the two pipes. A small, vertical pipe $h$, having its inner end closed up, is put in like manner, in through a screw-plug $v$, in which it fits tight, and the plug is screwed into the upper opening in the coupling L, so as to bring the pipe $h$, inside the pipe $l$, with a small space between the two pipes, as in case of pipes D and $f$, already described. The outer ends of the two pipes $h$ and $f$, are left entirely open to the air outside. The advantages derived from using the small pipe inside, instead of solid rods, are, first, that it heats through much quicker and gets under way with less delay; secondly, by having one end of the pipe open to admit the air, they cool down much quicker, when through with using, and cease to make gas to escape without burning, and also save the oil; thirdly, the pipes are lighter than the solid rods and make a lighter apparatus to handle. A flanged plate H, is placed a short distance below the pipe $g$, and supported on two standards $s s$, extending up, one on each side of the tray A, to which the plate is fastened by screws $j$. This plate H, has an opening in its center for the vertical pipe $b$, and another opening under the hole $i$, in the under side of the pipe $g$. (See Fig. 3.) A small, vertical plate $t$, is cast on the upper side of the plate H, a little way from its center, with a hole in it to receive and support the pipe $g$. A sheet of asbestus $k$, is laid in the bottom of the tray A, to hold a little oil to start the operation of the apparatus with. This is accomplished by turning the stop-cock $m$, and allowing the oil from the reservoir to flow through the pipe F, up over its inner end in the upper end of the pipe $b$, whence it runs through the space between the pipes D and $f$, $l$ and $h$, to the pipe $g$, and a little has run from the hole $i$, down into the asbestus in the tray. When this oil is ignited in the tray, and the pipes D and l, are heated by the flames, so as to convert the oil in them, between the inner and outer pipes, into gas that issues from the hole i, and is lighted, forming a flame that is projected down through the opening in the plate H, onto the pipe D, which increases and continues the heat of the pipes first started by the burning of the oil in the asbestus, which has soon burned out. This asbestus also serves to keep the tray A, from getting too hot. The plate H, has a projecting plate p, cast on its under side, with a semicircular notch in its lower end, and a like plate c, is cast on top of the tray, with a similar notch in it, to hold the side branch of the cross coupling a between them. (See Fig. 4.)

The side pipe f, has a spiral path made around it, by means of a wire e', wound around it, (see Fig. 3,) or by making a groove in the outside of the pipe f, to give the oil between the inner and outer pipes, a rotary circulation, as it passes along, to bring it up over the inner pipe f, against the outer one, or a spiral groove can be cut inside pipe D.

The oil, as it enters through the pipe F, to supply the apparatus, flows in over the top of that pipe, down into the lower end of the pipe b, which it fills up to the level of the top of the inside of pipe D. Then the further escape of the air in the pipe b, is cut off, and the oil will cease to rise in that pipe. In this way an air-chamber is formed in the pipe b, around that portion of the pipe F, that is in it, that serves to keep the oil in that part of the pipe F, cool, and that in case of a blow-back, there will be no hot oil to be carried back to the reservoir of oil. An air-chamber is also formed in the pipe g, between the hole i, and the closed end of the pipe, which serves as a cushion, to equalize and regulate the burning of the gas and the supply of oil.

The apparatus can be made with only one set of side pipes, or with several, as well as with two sets as represented, and retain the central pipes. In either case its operation will be the same.

Having thus described my improvements, I claim as my invention and desire to secure by Letters Patent—

1. In a gas-heating apparatus, a gas generator consisting of an outer pipe, having an inner pipe inclosed therein, with a space between the inner pipe and the outer pipe, communicating with a supply of oil, in combination with gas burning devices, substantially as described.

2. In a gas-heating apparatus, a gas generator, consisting of an outer pipe and a smaller pipe inclosed therein, said smaller pipe having one end closed and the other end open to the outer air, in combination with an oil supply pipe and devices for burning the gas generated, substantially as described.

3. In a gas-heating apparatus consisting of a vertical central pipe closed at its upper end, inclosing an oil supply pipe with its upper end open, in combination with horizontal side pipes connected at their inner ends with the said vertical pipe, and also connected at their outer ends by vertical pipes, to horizontal burning pipes extending in toward the central vertical pipe, substantially as described.

4. In a gas-heating apparatus constructed substantially as described, the combination of a tray to hold the devices, a plate supported on said tray and having projections on its top to support the burner pipes, with downwardly projecting notched plates on its under side, in connection with upwardly projecting plates on said tray, to hold the pipes between them, substantially as described.

JOHN W. WEEKS.

Witnesses:
BENJ. ARNOLD,
E. B. READ.